July 10, 1928.
S. V. C. PLATE
1,676,459
DEVICE FOR SEPARATING LIQUID FROM SOLID MATERIAL
Filed July 12, 1926
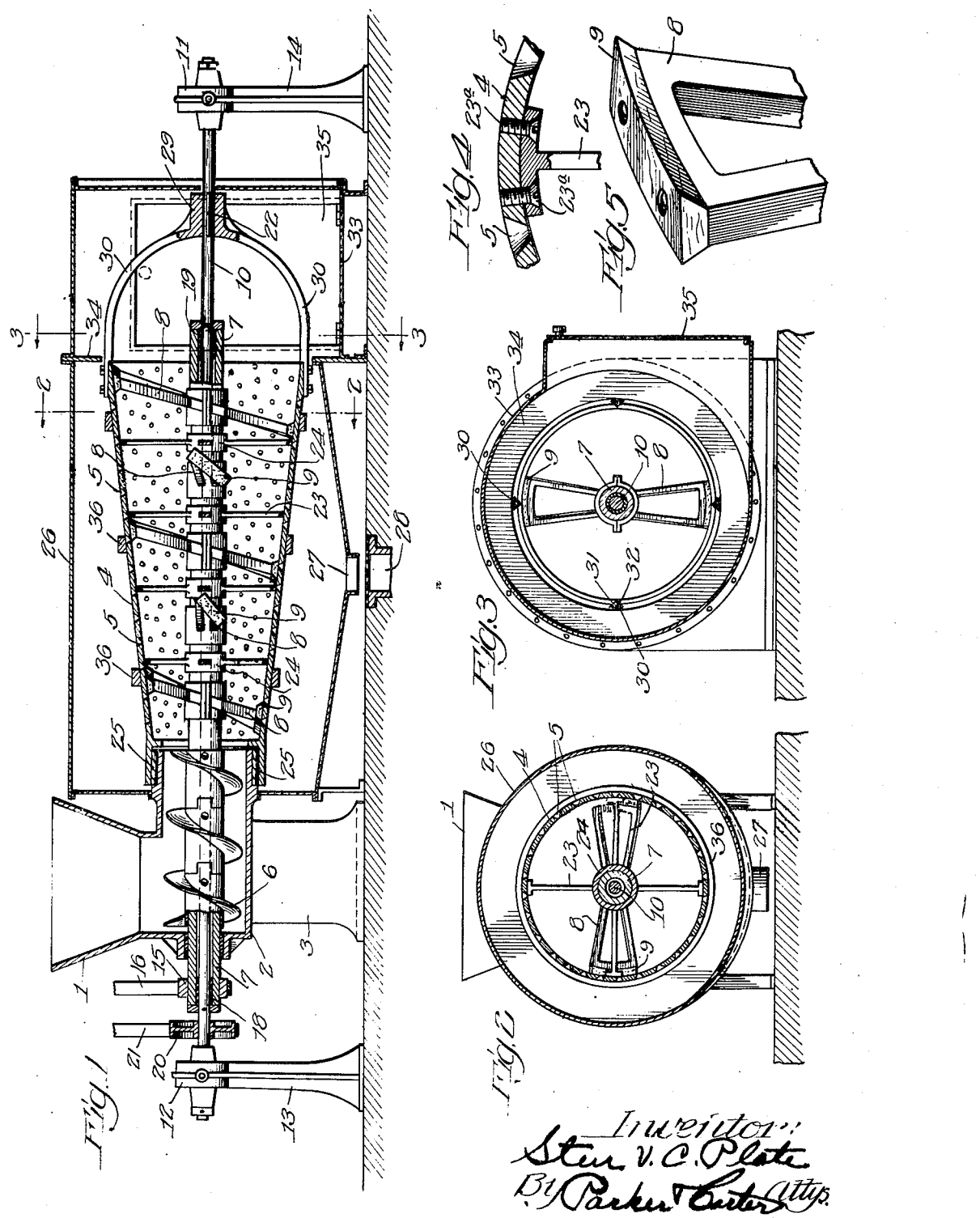

Patented July 10, 1928.

1,676,459

UNITED STATES PATENT OFFICE.

STEN V. C. PLATE, OF CHICAGO, ILLINOIS.

DEVICE FOR SEPARATING LIQUID FROM SOLID MATERIAL.

Application filed July 12, 1926. Serial No. 121,821.

This invention relates to devices for separating liquid from solid material such as peat and the like and has for its object to provide a new and improved device of this description. When peat for example is taken from the ground it is wet and is not in a condition to be burned. The present invention has as one of its objects to quickly and thoroughly remove the water from the peat so as to put it in condition for immediate burning or other uses.

The invention has further objects which are more particularly pointed out in the accompanying description.

Referring now to the drawings:

Fig. 1 is a vertical sectional view through one form of device embodying the invention.

Fig. 2 is a sectional view taken on line 2—2 of Fig. 1.

Fig. 3 is a sectional view taken on line 3—3 of Fig. 1.

Fig. 4 is an enlarged view of a portion of the material receiving receptacle showing the form of openings therein, and fastening devices for internal braces.

Fig. 5 is an enlarged perspective view showing the peripheral portions of the parts for removing the solid material from the inner face of the material receiving receptacle.

Like numerals refer to like parts throughout the several figures.

In carrying out the invention in the particular construction shown I provide a hopper 1 into which the material to be treated is delivered. This hopper is connected with a chamber 2, the hopper chamber being supported by the support 3. The material is delivered from the chamber 2 to the material receiving receptacle 4, and means is provided for rotating this receptacle. The receptacle is provided with a series of openings 5, preferably cone shaped, having their small ends connecting with the interior of the receptacle and their enlarged ends at the outer surface thereof. Located in the chamber 2 is a feeding device 6, which is illustrated as a feeding screw. This feeding device is connected with a hollow shaft, 7, which extends into the material receiving receptacle 4. Mounted upon this hollow shaft are the scrapers 8 which scrape the solid material from the inner face of the receptacle 4. These scrapers are inclined with relation to the shaft 7 and are preferably provided upon their outer ends with the removable pieces 9 of non-metallic material such as wood. The scrapers 8 are arranged more or less in the form of a screw and are sufficient in number so that the material on the inner surface of the receptacle will be pushed forward and is removable.

The hollow shaft 7 is rotatively mounted on a shaft 10 mounted in bearings 11 and 12 on supports 13 and 14. The hollow shaft 7 is rotated in any desired manner by means of a pulley 15 and a belt 16. This hollow shaft is preferably provided with roller bearings 18 and 19.

The shaft 10 may be rotated in any desired manner by means of the pulley 20 and belt 21 and is operatively connected with the receptacle 4 in any desired manner as by means of the keys 22.

The receptacle 4 is provided at intervals with braces 23 which are connected to hubs 24 surrounding the central shafts. The end of the chamber 2 projects into the receptacle 4 and acts as a bearing for one end thereof, there being rollers 25 on which the receptacle 4 rotates.

The receptacle 4 is surrounded by an outer casing 26 which receives the water. This receptacle is provided with a discharge 27 and the water is discharged therefrom into a discharge pipe 28 leading to any desired point.

The hub 29, which is fastened to the shaft 10 by keys 22, is provided with a series of arms 30 which connect with the receptacle 4. Any desired number of arms may be provided and I have shown four such arms. This provides a sufficient space between the arms for the discharge of the solid material from the receptacle 4. These arms 30 are preferably provided with inclined faces 31 and 32 which meet at a point as shown in Figure 3 so that the arms will not unduly obstruct the solid material being discharged from the receptacle 4.

A box 33 is provided at the end of the receptacle 4 into which the dry solid material is received. This box is separated from the casing 26 by the wall 34 which prevents the water thrown from the receptacle 4 from entering said box. The door 35 is provided by means of which the solid material may be removed from the box. The receptacle 4 may be provided with bands 36 at intervals to strengthen it by assisting it by taking part of the strain due to the centrifugal force.

I have described in detail the particular construction embodying the invention but it is of course evident that the parts may be varied in many particulars without departing from the spirit of the invention as embodied in the claims hereto appended and I will therefore not limit myself to the particular construction shown.

The braces 23 may be fastened to the receptacle 4 in any desired manner as by means of the screws 23ª. These braces hold the receptacle 4 so as to prevent it from bulging out due to the centrifugal force active when the receptacle is rotated. The receptacle 4 is shown cone shaped or larger in diameter at the end where the material is discharged than at the end where it is admitted. In such a construction the centrifugal force tends also to move the solid material along the inner face of the receptacle. By making openings 5 cone shaped stoppage thereof is prevented, for if solid material gets in these openings as soon as the material on the inside of the receptacle is scraped off by the scrapers the material in the openings is severed from the main body of solid material and the centrifugal force throws the material in these openings out so as to clear the openings.

The use and operation of my invention are as follows:

The material to be dried such as peat is placed in the hopper 1 and is then received into the chamber 2. While this is being done the shafts 7 and 10 and the receptacle 4 are being rotated. The screw thus discharges the wet material in the proper quantity into the receptacle 4. The centrifugal force due to the rotation of the receptacle 4 causes this material to fly out to the inner surface of the receptacle 4 where the solid material is stopped.

The liquid, by means of the centrifugal force, however, is forced out through the openings 5 into the casing 26 and is then discharged into the discharge pipe 28. The solid material thus has the moisture removed from it. This solid material is moved along the receptacle by the scrapers 8 and finally discharged into the box 33 and is removed through the door 35.

The scrapers and the receptacle 4 may be rotated at the desired speed so as to secure the proper relative motion to insure the best results.

It will be seen that I have here provided a simple, cheap and effective construction by means of which the water may be separated from solid material easily and quickly. In this construction the device occupies only a small vertical space and is arranged so that the material may be easily and conveniently inserted therein and removed therefrom.

I claim:

1. A device for removing liquid from solid material comprising a stationary chamber into which the material is received, a rotatable receptacle with which said chamber communicates, the wall of said receptacle being provided with a series of openings, a delivery mechanism for delivering the material from the chamber to said receptacle, a series of scrapers in said receptacle, braces in said receptacle intermediate said scrapers, and means for moving the scrapers and the receptacle relatively while the receptacle is rotating.

2. A device for separating liquid from solid material comprising a receptacle into which the material to be acted upon is received, said receptacle having a perforated wall, a shaft extending through said receptacle and operatively connected therewith, curved arms at the discharge end of said receptacle, said curved arms connected with said shaft at a distance from the discharge end of said receptacle, a hollow shaft surrounding said shaft, scrapers connected with said hollow shaft and means for simultaneously rotating both shafts.

3. A device for separating liquid from solid material comprising a receptacle into which the material to be acted upon is received, said receptacle having a perforated wall, a shaft extending through said receptacle and operatively connected therewith, a hub surrounding said shaft and braces connected with said hub and with said receptacle.

4. A device for separating liquid from solid material comprising a receptacle into which the material to be acted upon is received, said receptacle having a perforated wall, a shaft extending through said receptacle, a series of arms connected with said receptacle and operatively connecting it with said shaft, said arms provided with inclined faces which meet at the side thereof facing the receptacle, a hollow shaft surrounding said shaft, scrapers connected with said hollow shaft and means for simultaneously rotating both shafts, a stationary casing surrounding said receptacle for receiving the liquid discharge therefrom, a box at the end of said receptacle for receiving the solid material discharged from the receptacle.

5. A device for separating liquid from solid material comprising a rotatable receptacle into which the material to be acted upon is received, said receptacle having a perforated wall, scrapers in said receptacle, removable end pieces for said scrapers of non-metallic material which engage the inner wall of the receptacle and means for moving the scrapers and receptacle relatively when the receptacle is rotated.

6. A device for separating liquid from solid material comprising a chamber into which the material to be acted upon is received, a rotatable receptacle connected with said chamber, said receptacle being open at both ends and being provided with a perforated wall, said chamber overlapping the end of said receptacle and acting as a bearing therefor, a shaft extending through said receptacle, arms connected with said shaft so as to rotate therewith, said arms being connected with said receptacle and scrapers in said receptacle adapted to remove the solid material from the inner surface thereof.

7. A device for removing liquid from solid materials comprising a rotatable receptacle into which the material to be acted upon is received, said receptacle being provided with cone-shaped perforations, scrapers in said receptacle removable non-metallic end pieces therefor and means for moving the scrapers and receptacle relatively while the receptacle is rotated.

8. A device for separating liquid from solid material comprising a receptacle into which the materials to be acted upon is received, said receptacle having a perforated wall, scrapers in said receptacle, braces in said receptacle intermediate said scrapers and means for moving the scrapers and receptacle relatively when the receptacle is rotated.

Signed at Chicago, county of Cook and State of Illinois, this 2nd day of July, 1926.

STEN V. C. PLATE.